Sept. 1, 1942.   H. D. KING ET AL   2,294,462
SHOE CLEAT
Filed Nov. 18, 1941
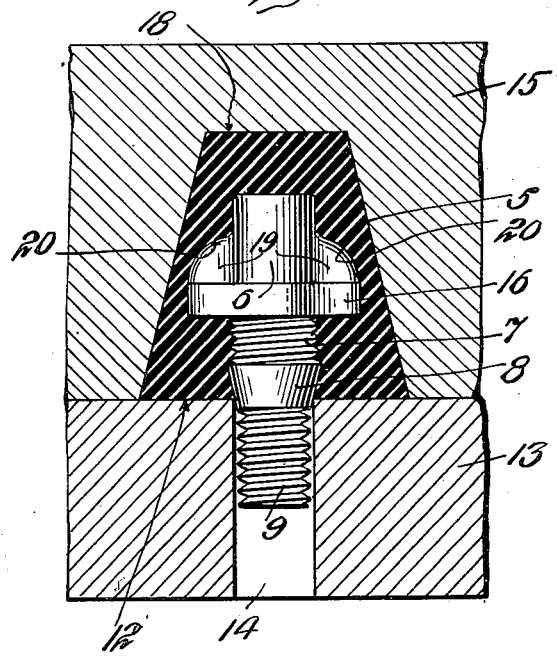
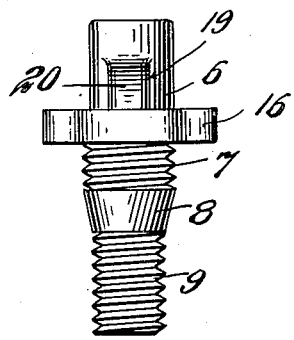
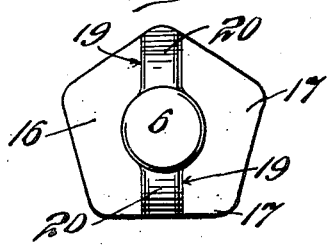
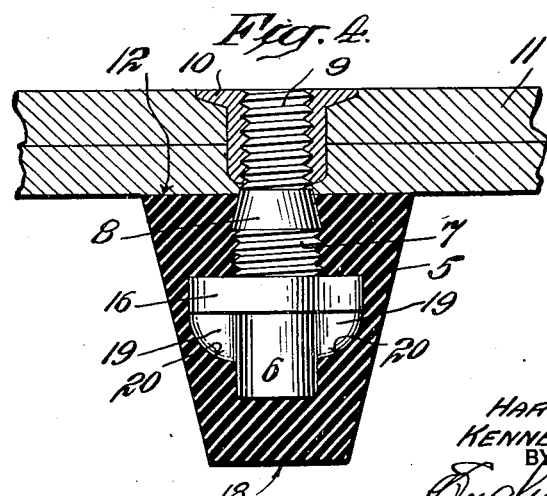
INVENTORS
HAROLD D. KING
KENNETH J. DURANT
BY
ATTORNEYS Patented Sept. 1, 1942

2,294,462

UNITED STATES PATENT OFFICE 2,294,462

SHOE CLEAT

Harold D. King, Medina, and Kenneth J. Durant, Akron, Ohio, assignors to American Hard Rubber Company, New York, N. Y., a corporation of New York Application November 18, 1941, Serial No. 419,544

2 Claims. (Cl. 36—59)

The invention relates to an improvement in cleats for shoes especially adapted for use by athletes performing or exercising on fields or grounds penetrable by the cleats. Such cleats usually comprise a body or cleat proper composed of a plastic material such as hard rubber or the like and a shank, one end of which is embedded in the cleat and the other end of which is threaded into the sole of the shoe. The stresses to which the cleats are subjected, such as rotational, transversely of the axis of the shank, and also a combined slantingly axial and transverse stress, known as an unbuttoning action, tend to and frequently do tear the cleat proper from the shank. Necessarily, therefore, numerous efforts have heretofore been made to form the head end of the shank or fastening means in such fashion as to prevent the cleat from being torn from it. But up to the present invention no entirely satisfactory head formation on the shank has been produced. It is the object of the present invention to produce such head formation on the shank as to prevent the plastic body or cleat proper from being torn from it irrespective of the direction and force of the dislodging stress.

It has been found by us by studying the condition of the hollow interior of a large number of cleats which have been torn from the head of the shank or fastening means what is thought to be the main reasons why the cleat can be pulled or torn off from the shank heads by the action of the cleats against the ground while the athlete is in action. As stated above, the main stresses to which the cleat is subjected in use, the rotational stress, the transverse stress, and the combined axial and transverse stress, as when the athlete or other shoe wearer starts or stops running suddenly, and which has an unbuttoning action on the cleat with respect to the shank head (and is considered to be the most effective stress in tearing the cleat from the shank head), all cause certain portions of the interior of the cleat to act against the corresponding portions of the shank head in clearly recognizable manner. By ascertaining at what points in the interior of the torn-off cleats the shearing action occurred, we have designed the shank head of the present invention to obviate the shearing action regardless of its direction and force. The result is a combination cleat and shank head which is substantially impossible to separate in field action. This is known not only by actual trial on the field, but also by laboratory experiment, subjecting the cleats to greater stress than they can be subjected to in actual use.

The improved shoe cleat is fully described hereinafter and is particularly pointed out in the appended claims.

In the accompanying drawing Fig. 1 shows the shank or fastening means in side elevation and the plastic body or cleat proper in longitudinal section, the complete cleat being shown in a two section mold; Fig. 2 is a side elevation of the shank or fastening means, taken at right angles to the position shown in Fig. 1; Fig. 3 is a top plan view of the head end of the shank; and Fig. 4 shows the improved cleat as applied to the bottom of the sole of a shoe.

The plastic body part or the cleat proper of the improved cleat structure is indicated at 5 and is shown in contour as a truncated cone, or it may have any preferred external shape. The shank or fastening means of the cleat consists of four general sections, a head 6, a middle threaded section 7, a tapered part 8 and a threaded outer end 9 adapted to screw into the nut 10 embedded in the sole 11 of the shoe so as to draw the bottom 12 of the cleat 5 tightly against the bottom of the sole. During the molding operation the shank is set upright in the lower mold part 13, the threaded outer end of the shank projecting downwardly into the pilot hole 14 therein, on the upper end of which the tapered part 8 of the shank rests. The plastic material having been placed on the head of the shank the upper mold part 15 is brought down onto the lower mold part with the cavity therein in alinement with the shank head so that the shank head becomes completely embedded in the cleat body 5, thereby producing the completed cleat.

It is in the head end of the shank which is embedded in the plastic body 5 that the present invention more particularly resides. This end of the shank includes in addition to the tapered part 8, the threaded middle section 7 and the outer cylindrical terminal portion 6, a plate-like polygonal section 16, shown in Fig. 3 as a pentagon. It will be noted from this figure that the corners 17 of the pentagon are rounded. The pentagon 16 serves two purposes, (1) it assists in preventing rotational action of the plastic body or cleat proper 5 on the shank, and next, it prevents the plastic body from being torn from the shank either by an axial movement or by a combined axial and transverse movement, known in the art as an unbuttoning action. It will be noted that the polygonal plate-like part 16 of the head of the shank is relatively large in cross-section and approaches closely to the outer side walls of the plastic body 5 thereby assuring that the maximum fastening effect is afforded to the head end of the shank. Projecting outwardly beyond the polygonal plate 16 is the cylindrical terminal portion 6 of the head of the shank. This part of the head of the shank is prolonged to close proximity with the outer or bottom end 18 of the plastic body or cleat proper, in comparison with former structures, whereby a greater resistance to the unbuttoning action is provided. In order to assist still further in preventing rotational action of the plastic body on the head of the shank a plurality of wing-like members 19 are provided (in the present instance two), extending from the sides of the cylindrical terminal portion 6 to the outer face of the polygonal plate 16. It will be noted that the outer edges 20 of the wing-like members have rounded outer edges.

The improved cleat for shoes described above was designed following inspection of numerous cleats of former construction. Numerous tests have shown that the combination of the threaded portion 7, the polygonal plate 16 and the cylindrical terminal end with the wing-like buttresses 19 anchor the shank or securing means in the plastic body or cleat proper 5 of the cleat more firmly than in the former constructions.

Having thus described the invention that we claim as new is:

1. A cleat for a shoe comprising a plastic body and means for securing the plastic body to a shoe having a shank with a threaded end adapted for connection with the shoe and a head end embedded in the plastic body, said head end of the shank consisting of three sections, a tapered inner part, a threaded middle part and an outer part including a plate-like polygonal portion of greater cross area than the other two parts of the head end of the shank, a substantially cylindrical terminal portion and two wings connecting the sides of the terminal portion with the outer face of the flat polygonal portion, the corners of the polygonal portion and the outer edges of the wings being rounded.

2. A cleat for a shoe comprising a plastic body and means for securing the plastic body to a shoe consisting of an end adapted for connection with a shoe and a head end embedded in the plastic body, said head end of the shank including a plate-like polygonal portion with rounded corners, a threaded portion located on the inner side of the polygonal portion, a substantially cylindrical terminal portion located on the outer side of the polygonal portion and a plurality of rounded wings connecting the cylindrical portion with the outer side of the polygonal portion.

HAROLD D. KING.
KENNETH J. DURANT.